(12) United States Patent
Clayton

(10) Patent No.: US 8,419,093 B1
(45) Date of Patent: Apr. 16, 2013

(54) TOOL FOR LIFTING AND MOVING TANKS

(76) Inventor: Theodore Clayton, Washington, NC (US)

( * ) Notice: Subject to any disclaimer, the term of this patent is extended or adjusted under 35 U.S.C. 154(b) by 0 days.

(21) Appl. No.: 13/481,980

(22) Filed: May 29, 2012

(51) Int. Cl.
*B65G 7/12* (2006.01)

(52) U.S. Cl.
USPC .......................... 294/31.2; 294/119.2; 294/114

(58) Field of Classification Search ................ 294/31.2, 294/15, 119.2, 114; 403/362
See application file for complete search history.

(56) References Cited

U.S. PATENT DOCUMENTS

| | | | |
|---|---|---|---|
| 1,250,602 A | 12/1917 | Lobdell | |
| 3,050,326 A * | 8/1962 | Miller | 294/15 |
| 4,463,978 A * | 8/1984 | Mountain et al. | 294/31.2 |
| 4,560,193 A * | 12/1985 | Beebe | 294/31.2 |
| 4,565,397 A | 1/1986 | Keen | |
| 4,795,202 A * | 1/1989 | Mader | 294/16 |
| 5,192,105 A * | 3/1993 | Walker | 294/119.2 |
| 5,658,118 A | 8/1997 | Luca | |
| 5,899,506 A * | 5/1999 | Tseeng | 285/148.23 |
| 5,984,612 A * | 11/1999 | Tatro | 414/448 |
| 6,065,788 A * | 5/2000 | Brady | 294/31.2 |
| 6,382,691 B2 | 5/2002 | Hazelton | |
| 6,840,556 B1 * | 1/2005 | Catlett | 294/16 |
| 7,575,260 B2 | 8/2009 | Foster et al. | |

\* cited by examiner

*Primary Examiner* — Saul Rodriguez
*Assistant Examiner* — Gabriela Puig
(74) *Attorney, Agent, or Firm* — Olive Law Group, PLLC

(57) ABSTRACT

A tool for lifting an elongate cylindrical tank for use in metal fabrication is provided. The tool includes a loop or material for looping around the elongate cylindrical tank and a cam block having a handle extending therefrom. The cam block carries the loop of material at an off-centered portion of the cam block. Rotation of the handle imparts rotation to the cam block to thereby reduce the slack defined between the loop and the cylindrical tank until the loop is in engagement with the cylindrical tank.

14 Claims, 3 Drawing Sheets

TOOL FOR LIFTING AND MOVING TANKS

TECHNICAL FIELD

This disclosure is related to a tool for use to lift and move tanks, and, more particularly, towards a tool for use to lift and move elongate cylindrical tanks, such as, for example, acetylene and similar tanks used for welding or tanks such as are used in a medical or other setting.

BACKGROUND

Various tanks are used in metal fabrication processes. For example, if a metal fabricator uses a cutting torch, that torch may use an acetylene fuel source to provide the fuel for creating a flame that can cut through metals. Similarly, a metal fabricator may use argon to purge a metal fabrication site in place of a flux core welding element. This leads to a cleaner and stronger weld site.

Acetylene and argon are typically stored in high-pressure storage cylinders. These cylinders may be pressurized to in excess of 2,000 pounds per square inch. Due to the high pressures, the tanks must have a sufficiently thick tank wall to withstand the hoop forces associated with such high pressures. With the sufficiently thick tank walls, the tanks had a relatively high mass associated therewith. Furthermore, the tanks were usually of a large enough volume so that the metal fabricator could use the tank for a prolonged period of time without refilling. The increased weight and large size of the tanks made moving the tanks difficult. Many tanks are four to five feet in height and to move the tank required either a person to wrap their arms around the tank or to use a hand truck or the like. Neither of these methods of moving are helpful in elevating the tank a significant distance off of the ground and neither are particularly safe. Many governmental regulations require tanks to be elevated a specified height from the ground.

Additionally, many other industries use elongate cylinder tanks for storing a compressed gas such as the medical industry, automotive industry, and the like.

A need therefore exists for a method or solution that addresses these disadvantages and difficulties associated with moving tanks.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is a tool for moving elongate cylinder tanks, such as, for example, tanks containing compressed gases used for metal fabrication. The tool includes a loop that generally approximates the diameter of an elongate cylinder and a cam block that carries the loop at an off-centered portion of the cam block. The cam block is rotatable such that slack of the loop is reduced during rotation of the cam block until the loop is substantially engaged with an outer diameter of the elongate cylinder.

According to one or more embodiments, the cam block defines an opening at the off-centered portion of the cam block for receiving the loop.

According to one or more embodiments, a crimp joint is received within the opening. The crimp joint is configured to receive respective ends of the loop.

According to one or more embodiments, the tool includes a set screw extending through the cam block into engagement with the crimp joint for securing the crimp joint within cam block.

According to one or more embodiments, the tool includes a handle extending from the cam block.

According to one or more embodiments, the handle extends from an off-centered portion of the cam block.

According to one or more embodiments, the cam block is generally cylindrical.

According to one or more embodiments, the elongate cylinder is one of an acetylene, oxygen, argon, helium, and a nitrogen tank.

According to one or more embodiments, a method for lifting an elongate cylindrical tank for use with metal fabrication is provided. The method includes using a tool defining a loop of material, placing the loop around an outer diameter of the cylindrical tank, rotating a cam block that carries the loop at an off-centered portion thereof until the slack defined between the loop and cylindrical tank is reduced such that the loop is in engagement with the tank, and lifting upward on the tank to raise the tank a predetermined distance.

According to one or more embodiments, rotating a cam block includes rotating a handle carried by the cam block.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Figure 1:
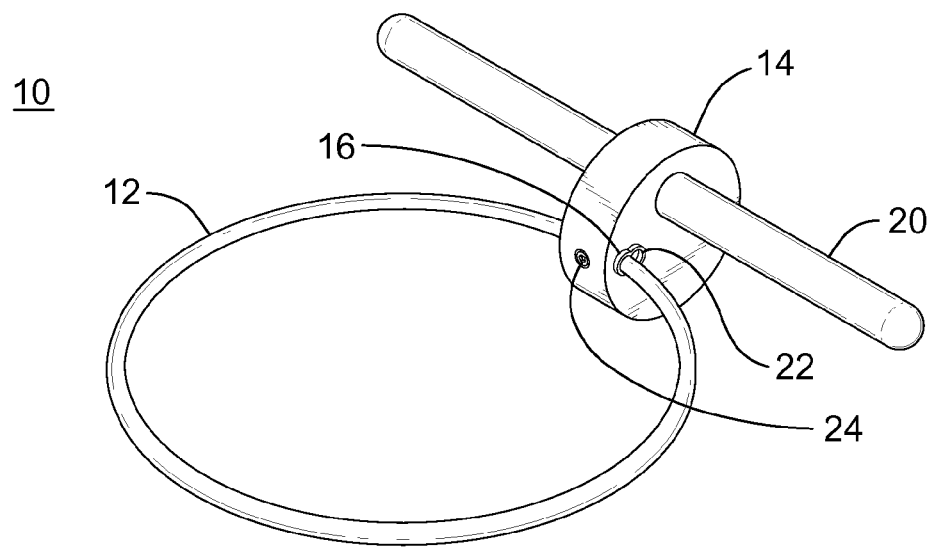
FIG. 1 illustrates a top view of a tool for use in lifting an elongate cylindrical tank according to one or more embodiments disclosed herein.
Figure 2:
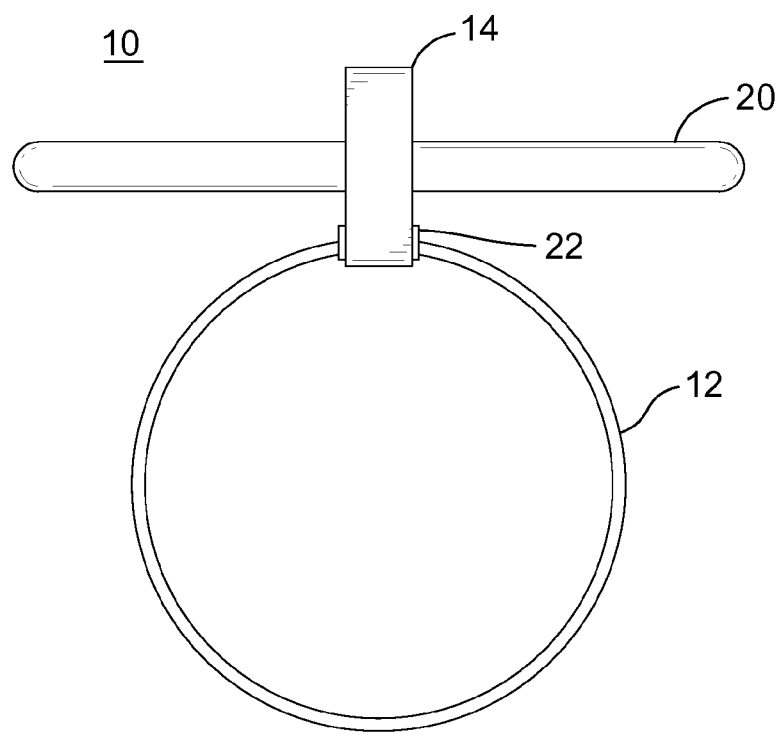
FIG. 2 illustrates a perspective view of a tool for use in lifting an elongate cylindrical tank according to one or more embodiments disclosed herein.

FIG. 1 and FIG. 2 illustrate views of a tool generally designated 10 for use with lifting and moving elongate cylindrical tanks, such as those that may be used in metal fabrication or in a hospital or automotive setting. The tool 10 includes a loop of material 12 that generally approximates the diameter of an elongate cylinder. The loop of material 12 may be a braided cable as illustrated, or may alternatively be any material capable of forming a generally conforming loop of material such as, for example, a chain, rope, or the like.

A cam block 14 carries the loop 12 at an off-centered portion of the cam block 14. The cam block 14 is rotatable such that slack of the loop 12 is reduced during rotation of the cam block 14 until the loop 12 is substantially engaged with an outer diameter of an elongate cylinder. In this manner, rotation of the cam block 14 towards the center of the loop 12 acts to reduce the internal diameter formed by the tool 10 so that the loop 12 can be tightened into engagement against a cylindrical tank.

The cam block 14 may define an opening 16 at the off-centered portion thereof for receiving the loop 12. In this manner, the loop 12 extends through the cam block 14. A crimp joint 22 may be received within the opening 16. The crimp joint 22 is configured to receive respective ends of the loop 12. In this manner, each end of a length of material can be positioned in the crimp joint 22, thereby forming the loop 12. Alternatively, any type of joint may be employed, including welding of the loop 12, appropriate fasteners, and the like. The cam block 14 may further include a set screw 24 extending through the cam block 14 into engagement with the crimp joint 22 for securing the crimp joint 22 within cam block 14. Alternatively, the crimp joint 22 may be fixedly secured within opening 16.

The tool 10 may further include a handle 20 extending from the cam block 14. The handle 20 may include a grip portion and may be rotatable relative to the cam block 14. The handle 20 may extend from an off-centered portion of the cam block 14. The cam block 14 may be generally cylindrical.

Figure 3:
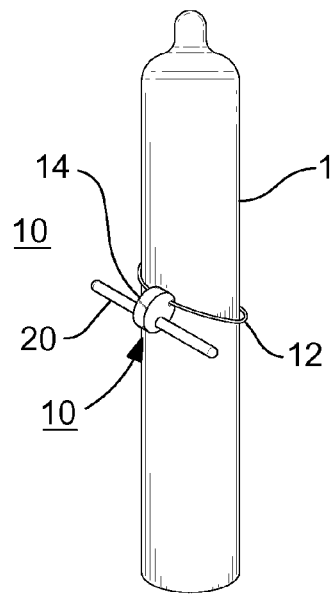
FIG. 3 illustrates a perspective view of a the tool of FIG. 1 and FIG. 2 installed about an elongate tank.
Figure 4:
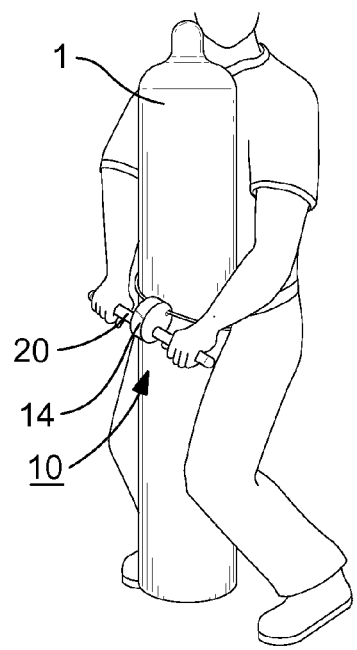
FIG. 4 illustrates a side view of a person using the tool of FIG. 1 and FIG. 2 for lifting the elongate tank according to one or more embodiments disclosed herein.
Figure 5:
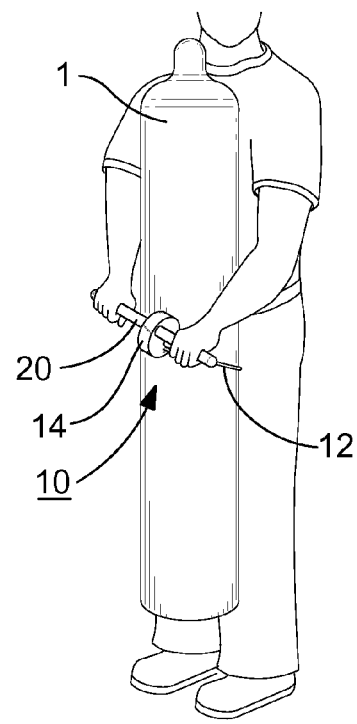
FIG. 5 illustrates a side view of a person using the tool of FIG. 1 and FIG. 2 for lifting the elongate tank according to one or more embodiments disclosed herein.

Installation and use of the tool 10 is illustrated in FIG. 3, FIG. 4, and FIG. 5. As illustrated, the tool 10 is positioned such that the loop 12 is provided around the elongate cylinder tank 1. The elongate cylinder tank 1 may be filled with any desired compressed gas and may be one of an acetylene, oxygen, argon, and nitrogen tank. Once the loop 12 is positioned around the tank 1, the operator rotates the handle 20 backwards towards the tank 1. This imparts a corresponding rotational movement to the cam block 14 which then forces the cam block 14 to engage against the outer surface of tank 1. This in turn causes the slack between the loop of material 12 and the tank 1 to decrease until the loop is in general engagement contact with the tank. The operator then lifts upwards on the tank 1 and transports to a desired location. FIG. 5 illustrates one operator lifting on opposing sides of the handle 20, though two or more operators may be employed. As illustrated, the operator's legs and arms are positioned about opposing sides of tank 1. In this manner, the tool 10 disclosed herein allows for a more stable and secure lifting and moving of the elongate tank 1 than other tools and methods.

Figure 6:
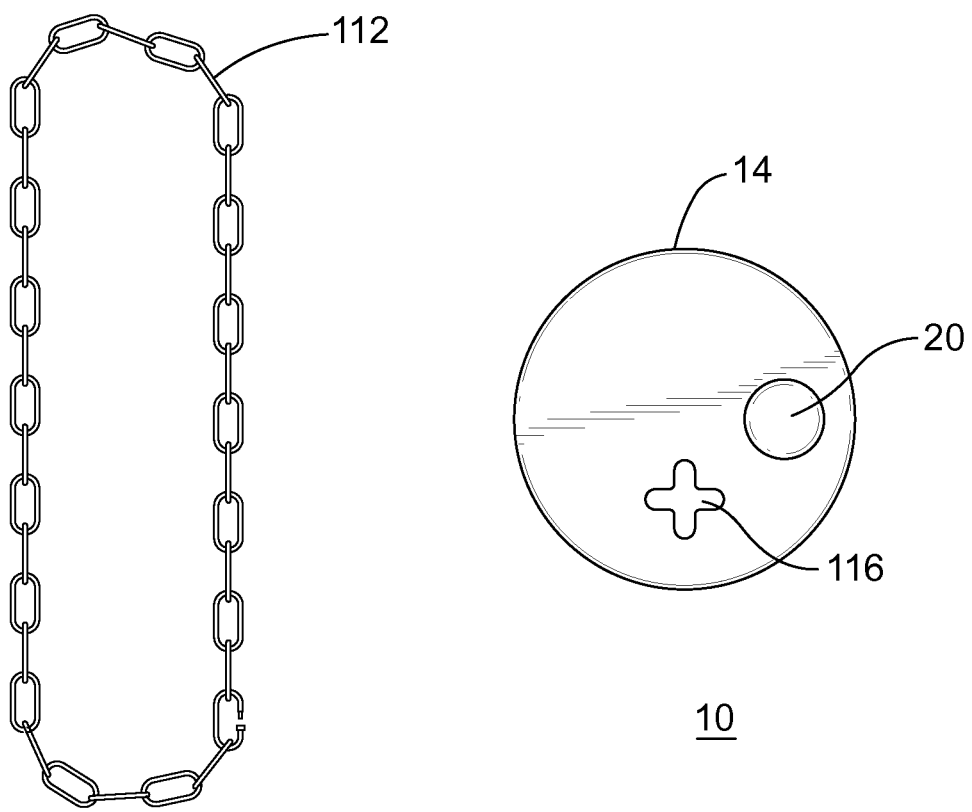
FIG. 6 illustrates an alternate embodiment of a tool according to one or more embodiments disclosed herein.

FIG. 6 illustrates an alternate embodiment of a tool 10. The tool 10 includes a cam block 14 and handles 20 in a manner similar to the tool illustrated in FIGS. 1 and 2. Tool 10 includes chain 112 that is configured for being received within opening 116 of the cam block 14. The opening 116 is sized to receive the chain 112 and may be configured such that the chain 112 cannot slide within opening 116. The length of chain 112 may be adjusted by addition or removal or chain links.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A tool for moving elongate cylinder tanks, the tool comprising:
   a flexible loop of material that generally approximates the diameter of an elongate cylinder, the flexible loop being formed from a continuous material having first and second ends joined together to form the loop; and
   a cam block that carries the loop at an off-centered portion of the cam block, the cam block being rotatable such that slack of the loop is reduced during rotation of the cam block until the loop is substantially engaged with an outer diameter of the elongate cylinder,
   wherein the cam block defines an opening that extends through opposing ends thereof, the opening sized to receive a crimp joint that joins the respective first and second ends of the loop.

2. The tool according to claim 1, further including a set screw extending through the cam block into engagement with the crimp joint for securing the crimp joint within the opening of the cam block.

3. The tool according to claim 1, further comprising a handle extending from the cam block.

4. The tool according to claim 3, wherein the handle extends from an off-centered portion of the cam block.

5. The tool of claim 3, wherein the handle extends from the cam block in a horizontal direction when the tool is installed about the tank and has a length such that a user positioned about the tank oppositely from the handle can reach the handle.

6. The tool of claim 5, wherein the handle comprises a first portion extending from one side of the cam block and a second portion extending from an opposite side of the cam block.

7. The tool according to claim 1, wherein the cam block is generally cylindrical.

8. The tool according to claim 1, wherein the elongate cylinder is one of an acetylene, oxygen, argon, helium, and a nitrogen tank.

9. The tool of claim 1, wherein the loop is a flexible cable.

10. The tool of claim 1, wherein, in a first position, the loop is slack and not in general engagement with the tank, and, in a second position in which the cam block is rotated towards the tank, the slack is reduced until the loop is generally taut and a portion of which is in general engagement with the tank.

11. A tool for lifting an elongate cylindrical tank for use in metal fabrication, the tool comprising:
    a loop of flexible material for looping around the elongate cylindrical tank, the loop being formed from a continuous material having first and second ends joined together to form the loop; and
    a cam block having a handle extending therefrom, the cam block carrying the loop of material at an off-centered portion of the cam block,
    wherein the cam block defines an opening that extends through opposing ends thereof, the opening sized to receive a crimp joint that joins the respective first and second ends of the loop,
    whereby rotation of the handle imparts rotation to the cam block to thereby reduce the slack of the loop until the loop is taut and in engagement with the cylindrical tank.

12. The tool according to claim 11, further including a set screw extending through the cam block into engagement with the crimp joint for securing the crimp joint within the opening of the cam block.

13. The tool according to claim 11, wherein the cam block is generally cylindrical.

14. The tool according to claim 11, wherein the elongate cylinder is one of an acetylene, oxygen, argon, helium, and a nitrogen tank.

* * * * *